United States Patent
Lu et al.

(10) Patent No.: US 12,514,266 B2
(45) Date of Patent: Jan. 6, 2026

(54) COMPOSITION CONTAINING QUERCETAGETIN

(71) Applicant: Chenguang Biotech Group Co., Ltd., Hebei (CN)

(72) Inventors: Qingguo Lu, Hebei (CN); Di Wu, Hebei (CN); Yunhe Lian, Hebei (CN); Xiuzhai Qin, Hebei (CN); Shaodong Ji, Hebei (CN); Xinying Cheng, Hebei (CN)

(73) Assignee: Chenguang Biotech Group Co., Ltd., Hebei (CN)

( * ) Notice: Subject to any disclaimer, the term of this patent is extended or adjusted under 35 U.S.C. 154(b) by 574 days.

(21) Appl. No.: 17/906,056

(22) PCT Filed: Mar. 10, 2021

(86) PCT No.: PCT/CN2021/079963
§ 371 (c)(1),
(2) Date: Sep. 9, 2022

(87) PCT Pub. No.: WO2021/180117
PCT Pub. Date: Sep. 16, 2021

(65) Prior Publication Data
US 2023/0122252 A1    Apr. 20, 2023

(30) Foreign Application Priority Data

Mar. 10, 2020 (CN) .......................... 202010160134.5
Feb. 26, 2021 (CN) .......................... 202110216085.7

(51) Int. Cl.
| | |
|---|---|
| *A23K 20/126* | (2016.01) |
| *A23K 20/147* | (2016.01) |
| *A23K 20/158* | (2016.01) |
| *A23K 20/163* | (2016.01) |
| *A23K 20/174* | (2016.01) |
| *A23K 20/179* | (2016.01) |

(52) U.S. Cl.
CPC .......... *A23K 20/126* (2016.05); *A23K 20/147* (2016.05); *A23K 20/158* (2016.05); *A23K 20/163* (2016.05); *A23K 20/174* (2016.05); *A23K 20/179* (2016.05)

(58) Field of Classification Search
CPC .. A23K 20/126; A23K 20/147; A23K 20/158; A23K 20/163; A23K 20/174; A23K 20/179
See application file for complete search history.

(56) References Cited

U.S. PATENT DOCUMENTS

2001/0043983 A1* 11/2001 Hamilton ............. A23K 20/147
426/635
2003/0105027 A1* 6/2003 Rosenbloom ........... A61P 17/02
514/474

FOREIGN PATENT DOCUMENTS

| CN | 102190646 A | 9/2011 |
| CN | 110003071 A | 7/2019 |
| CN | 110105257 A | 8/2019 |
| CN | 110372554 A | 10/2019 |
| KR | 20120035741 | 4/2012 |

OTHER PUBLICATIONS

Lu, H., Yang, S., Ma, H., Han, Z., & Zhang, Y. (2016). Bioassay-guided separation and identification of anticancer compounds in *Tagetes erecta* L. flowers. Analytical Methods, 8(15), 3255-3262. https://doi.org/10.1039/c5ay03256c (Year: 2016).*
Gong, Y., Liu, X., He, W.-H., Xu, H.-G., Yuan, F., & Gao, Y.-X. (2012). Investigation into the antioxidant activity and chemical composition of alcoholic extracts from defatted marigold (*Tagetes erecta* L.) residue. Fitoterapia, 83(3), 481-489. https://doi.org/10.1016/j.fitote.2011.12.013 (Year: 2012).*
Chitrakar, B., Zhang, M., & Bhandari, B. (2019). Edible flowers with the common name "Marigold": Their therapeutic values and processing. Trends in Food Science Technology, 89, 76-87. https://doi.org/10.1016/j.tifs.2019.05.008 (Year: 2019).*
Mercola. (May 9, 2015). The Natural Ingredient Resource Center because natural matters!. Natural Ingredient Resource Center. https://naturalingredient.org/?p=899 (Year: 2015).*
Chkhikvishvili et al., "Constituents of French Marigold (*Tagetes patula* L.) Flowers Protect Jurkat T-Cells against Oxidative Stress", Oxidative Medicine and Cellular Longevity, pp. 1-10 (2016).
Gong et al., "Investigation into the antioxidant activity and chemical composition of alcoholic extracts from defatted marigold (*Tagetes erecta* L.) residue", Fitoterapia 83(3):481-489 (2011).
Lu et al., "Bioassay-guided separation and identification of anti-cancer compounds in *Tagetes erecta* L. flowers", Analytical Methods, 8(15):3255-3262 (2016).
International Search Report issued in International Application No. PCT/CN2021/079963, mailed on Jun. 9, 2021.
Xu et al., "Subcritical water extraction and antioxidant activity evaluation with on-line HPLC-ABTS+ assay of phenolic compounds from marigold (*Tagetes erecta* L.) flower residues", J. Food Sci. Technol., 52(6):3803-3811 (2015).

* cited by examiner

*Primary Examiner* — Viren A Thakur
*Assistant Examiner* — Karla Isobel Diviesti
(74) *Attorney, Agent, or Firm* — Knobbe, Martens, Olson & Bear, LLP

(57) ABSTRACT

A composition contains quercetagetin and 6-hydroxykaempferol, and, optionally further includes patuletin. The composition has an excellent antioxidant effect, and can be used as an active additive in food, drugs, health care products, cosmetics, and feed. In addition, the composition can prompt animal growth, reduce ratio of feed to gain, and improve meat quality in the feed.

14 Claims, 2 Drawing Sheets

COMPOSITION CONTAINING QUERCETAGETIN

CROSS-REFERENCE TO RELATED APPLICATION

The present application claims priority to Chinese Patent Applications No. 202010160134.5, entitled "COMPOSITION CONTAINING QUERCETAGETIN" filed on Mar. 10, 2020, and No. 202110216085.7, entitled "COMPOSITION CONTAINING QUERCETAGETIN" filed on Feb. 26, 2021, the entire disclosures of which are incorporated herein by reference in their entirety.

TECHNICAL FIELD

The present invention relates to an active additive which can be applied to the fields of feed, food, health care products, drugs, cosmetics and the like.

BACKGROUND ART

Feed additives refer to a small amount or trace substances added in the process of feed production, processing and use. Feed additives are used in small amount in feed but have significant effect. Feed additives are the inevitable raw materials used in modern feed industry, which have obvious effects on strengthening the nutritional value of basic feed, improving animal production performance, ensuring animal health, saving feed cost and improving the quality of animal products and the like. Feed additives are usually divided into nutritional additives and non-nutritional additives. Nutritional additives include mineral trace element additives, vitamin additives, amino acid additives, non-protein nitrogen compound additives and the like. Non-nutritional additives mainly include growth-promoting additives, feed preservation additives, appetite promoting and quality improving additives and the like. Common additives for appetite promotion and quality improvement include sodium glutamate, amaranth, carmine, tartrazine, sunset yellow, *gardenia* yellow, β-carotene, amino sugars, as well as some flavors and attractants and the like. By methods such as seasoning, flavoring, and coloring the feed, such additives can stimulate the sensory organs of livestock and poultry, significantly increase their appetite, and improve the color tone of livestock and poultry products, so that the poultry meat and egg yolk have beautiful color. Commonly used antioxidants in feed are butyl hydroxy toluene, butyl hydroxy methoxybenzene, ethoxyquin, propyl gallate and the like, which can prevent fat, protein, carbohydrates and fat-soluble vitamins in feed from being oxidized and decomposed and resulting in spoilage. Due to the price and other reasons, the antioxidant used in feed is mainly ethoxyquin (or abbreviated EQ), this product is the most widely used feed antioxidant variety at home and abroad, with good effect, low price and safe use. However, the antioxidant effect of ethoxyquin on lipid is not ideal, and the color of the product will become darker and darker during storage, which will affect the color of feed when it is used in premix in large amount.

Quercetagetin, known as the chemical name of 3,3,4,5,6,7-hexahydroxyflavone, has important pharmacological effects such as anti-inflammation, anti-allergy, lowering blood pressure, anti-arrhythmia, anti-platelet aggregation, anti-oxidation and anti-tumor. In addition, the main plant source of quercetagetin is the extract of plants of Compositae family. Plants of Compositae family containing quercetagetin include *Tagetes erecta* L (marigold), *Tagetes patula* (French marigold), *Calendula officinalis* L (*calendula*), *Artemisia annua* L, *Artemisia* sacrorum ledeb, *Flaveria bidentis* L, *Helichrysum bracteatum* (*helichrysum*), *Matricaria recutita* L (chamomile), *Filifolium sibiricum* L (*helichrysum*) and *Inula japonica* Thunb. (*inula* flower). At present, the research of quercetagetin mainly focuses on its pharmacological activity, but it has not been applied in the fields of food and feed additives.

The present application finds out that the composition containing quercetagetin has excellent antioxidant effect, and when the composition of the present application is added in an amount of 2 ppm to 100 ppm into the lipid, the antioxidant effect of which is equivalent to that of 150 ppm of ethoxyquin (EQ). In addition to greatly improving the antioxidant effect, the feed added with the composition of the present application further has the functions of promoting the growth of livestock and poultry and improving the meat quality of livestock and poultry.

SUMMARY OF THE INVENTION

The present application provides a composition that can be used as an additive for food, drugs, health care products, cosmetics, feed and the like.

The composition is a composition containing quercetagetin, and in addition to quercetagetin, the composition further comprises 6-hydroxykaempferol.

In the composition, a content ratio of quercetagetin:6-hydroxykaempferol is 100:(1-43); the content ratio is preferably selected from 100:(1-40), 100:(1-35), 100:(1-30), 100:(1-25), 100:(1-20), 100:(1-15); and may further selected from 100:(1-10), 100:(1-9), 100:(1-8), 100:(1-7), 100:(1-6), 100:(1-5), 100:(1-4), 100:(1-3), 100:(1-2; 100:(2-10), 100:(2-9), 100:(2-8), 100:(2-7), 100:(2-6), 100:(2-5), 100:(2-4), 100:(2-3; 100:(3-10), 100:(3-9), 100:(3-8), 100:(3-7), 100:(3-6), 100:(3-5), 100:(3-4; 100:(4-10), 100:(4-9), 100:(4-8), 100:(4-7), 100:(4-6), 100:(4-5; 100:(5-10), 100:(5-9), 100:(5-8), 100:(5-7), 100:(5-6; 100:(6-10), 100:(6-9), 100:(6-8), 100:(6-7; 100:(7-10), 100:(7-9), 100:(7-8; 100:(8-10), 100:(8-9) and 100:(9-10).

Another aspect of the present invention relates to a composition containing quercetagetin, characterized in that, containing quercetagetin, and further containing 6-hydroxykaempferol and patuletin.

In the composition, the content ratio of quercetagetin:6-hydroxykaempferol is 100:(1-43); preferably selected from 100:(1-40), 100:(1-35), 100:(1-30), 100:(1-25), 100:(1-20), 100:(1-15); and may further selected from 100:(1-10), 100:(1-9), 100:(1-8), 100:(1-7), 100:(1-6), 100:(1-5), 100:(1-4), 100:(1-3), 100:(1-2; 100:(2-10), 100:(2-9), 100:(2-8), 100:(2-7), 100:(2-6), 100:(2-5), 100:(2-4), 100:(2-3; 100:(3-10), 100:(3-9), 100:(3-8), 100:(3-7), 100:(3-6), 100:(3-5), 100:(3-4; 100:(4-10), 100:(4-9), 100:(4-8), 100:(4-7), 100:(4-6), 100:(4-5; 100:(5-10), 100:(5-9), 100:(5-8), 100:(5-7), 100:(5-6; 100:(6-10), 100:(6-9), 100:(6-8), 100:(6-7; 100:(7-10), 100:(7-9), 100:(7-8; 100:(8-10), 100:(8-9) and 100:(9-10).
In the composition, the content ratio of quercetagetin:patuletin is 100:(1-40); and preferably selected from 100:(1-35), 100:(1-30), 100:(1-25), 100:(1-20), 100:(1-15), 100:(1-10) and 100:(1-5).

The present invention further relates to use of the composition containing quercetagetin, which is used as an additive ingredient in food, drugs, health care products, cosmetics and feed. Preferably, the composition is applied in feed. Preferably, the composition enables the feed to have the effects of promoting the growth of livestock and poultry and reducing the ratio of feed to gain.

The present invention further relates to use of the composition containing quercetagetin, the composition is used as an additive ingredient in food, drugs, health care products, cosmetics and feed. Preferably, the composition is used as an antioxidant.

The present application also provides a feed, the raw materials of the feed comprises any one or more selected from lipid, protein, vitamin, pigment, carbohydrate, as well as the above-mentioned composition containing quercetagetin. The lipid is selected from vegetable fat or animal fat; the vegetable fat is selected from soybean oil, cottonseed oil, sunflower oil, peanut oil, olive oil, sesame oil, palm oil, corn oil and the like, the animal fat is selected from lard, beef fat, mutton fat, fish oil and the like; the protein is vegetable protein or animal protein, includes but not limited to fish meal, soybean protein, and glutelin; the pigment raw materials include but are not limited to lutein, lycopene, capsanthin, carotene, curcumin and the like; the vitamin raw materials include but are not limited to vitamin A, vitamin B, vitamin C, vitamin D, vitamin E and their derivative esters and the like. The feed is feed for animal, and the feed for animal includes but is not limited to chicken feed, cattle feed, sheep feed, pig feed, dog feed, cat feed and the like.

The present invention further relates to a lipid composition, which contains a composition containing quercetagetin.

The present invention also relates to a pigment composition, which contains a composition containing quercetagetin.

The present invention also relates to a vitamin composition, which contains a composition containing quercetagetin.

The present invention also relates to a protein composition, which contains a composition containing quercetagetin.

The present invention also relates to a carbohydrate composition, which contains a composition containing quercetagetin.

The composition containing quercetagetin described in the present application can be used as an additive ingredient of any food, feed, cosmetics, health care products and drugs, as an antioxidant, a growth promoter and/or a quality improver.

The present application provides the use of the composition containing quercetagetin, which includes using the composition as an active additive in feed, which has the effects of anti-oxidation, promoting animal growth, and reducing the ratio of feed to gain of animals. The animals include, but are not limited to broilers, laying hens, pigs, rabbits, sheep, cattle, fish, cats, dogs and the like.

The composition containing quercetagetin is obtained by extracting natural raw materials, or obtained by the formulation of each component.

The composition containing quercetagetin described by the present application can be obtained by the extraction of plants of Compositae family, such as *Tagetes erecta* L (marigold), *Tagetes patula* (French marigold), *Calendula officinalis* L (calendula), *Artemisia annua* L, *Artemisia sacrorum* ledeb, *Flaveria bidentis* L, *Helichrysum bracteatum* (helichrysum), *Matricaria recurita* L (chamomile), *Filifolium sibiricum* L (helichrysum) and *Inula japonica* Thunb. (inula flower). Flowers of the above-mentioned plants of Compositae family, or other processed forms of flowers, or flower meal are preferred. Said other processed forms of the flowers include, but are not limited to, fermentation treatment, granulation treatment, drying treatment, or crushing treatment. The flower meal refers to the flower residue after degreasing treatment.

The composition containing quercetagetin described by the present application can be obtained by performing extraction by solvent extraction, ultrasonic-assisted extraction, microwave-assisted extraction, supercritical carbon dioxide extraction and the like. In solvent extraction, the solvent for extraction is selected from ethanol solution, methanol solution, acetone solution, ethyl acetate, butanone, n-hexane, chloroform, dichloromethane and the like.

The composition containing quercetagetin described by the present application can be obtained by further separation and purification after extraction, and the purification methods include macroporous resin separation method, liquid-liquid extraction method, column chromatography separation method, solid-liquid separation method, centrifugal separation method and the like.

The content of each component in the composition containing quercetagetin is detected by high performance liquid chromatography method as follows:

the conditions for high performance liquid chromatography (HPLC) detection are as follows: mobile phase: phase A is 1‰ formic acid solution, phase B is acetonitrile, and gradient elution is used for analysis (the conditions for gradient elution are shown in Table 1); the flow rate is controlled at 0.3 ml/min during elution; column temperature: 40° C.; chromatographic column: BEH C18 column (2.1 mm×50 mm, particle size 1.7 μm); ultraviolet detector wavelength: 210 to 500 nm; injection volume: 0.6 μL. Among them, the retention time of quercetagetin is about 4 to 5 min, the retention time of 6-hydroxy kaempferol is about 6 to 7 min, and the retention time of patuletin is about 7.7 to 8.2 min.

The detection conditions are as follows:

| Time (min) | Flow rate (mL/min) | Phase A (%) | Phase B (%) |
|---|---|---|---|
| Initial | 0.3 | 90.0 | 10.0 |
| 1 | 0.3 | 90.0 | 10.0 |
| 15 | 0.3 | 65.0 | 35.0 |
| 53 | 0.3 | 0.0 | 100.0 |
| 57 | 0.3 | 0.0 | 100.0 |
| 57.5 | 0.3 | 90.0 | 10.0 |
| 60 | 0.3 | 90.0 | 10.0 |

The content of each component in the composition containing quercetagetin described in the present application is calculated by the area normalization method, and the ratio of the percentage of peak area of each component to the total peak area is the content ratio for each component.

Advantageous Effect

When the content of the composition containing quercetagetin described in the present application in lipid is 2 to 100 ppm, its antioxidant performance is equivalent to that of 150 ppm ethoxyquin (EQ).

The composition containing quercetagetin provided by the present application can promote animal growth, reduce the ratio of feed to gain, and improve meat quality.

The composition containing quercetagetin described in the present application can be used as an additive ingredient of any food and feed, as an antioxidant, a growth promoter and/or a quality improver.

SPECIFIC MODES FOR CARRYING OUT THE EMBODIMENTS

Figure 1:
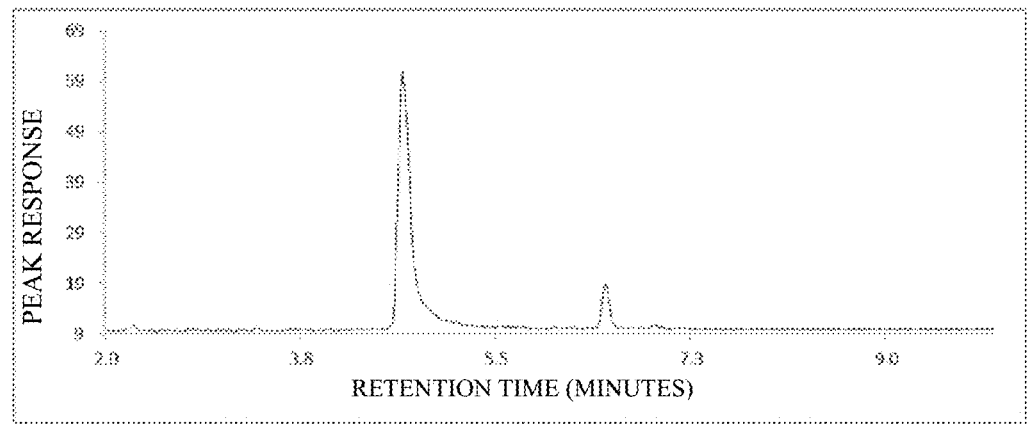
FIG. 1 of the Drawings shows the HPLC chromatogram of the composition 9 prepared in Example 9.
Figure 2:
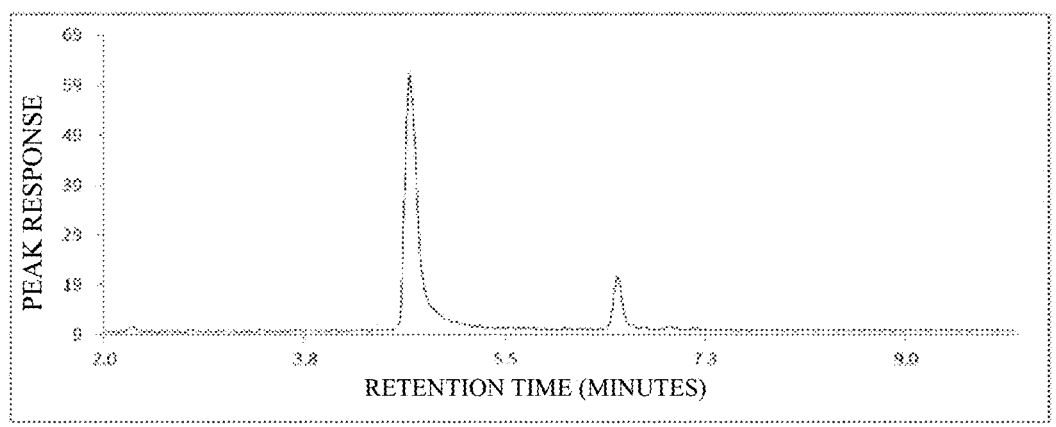
FIG. 2 of the Drawings shows the HPLC chromatogram of the composition 10 prepared in Example 10.
Figure 3:
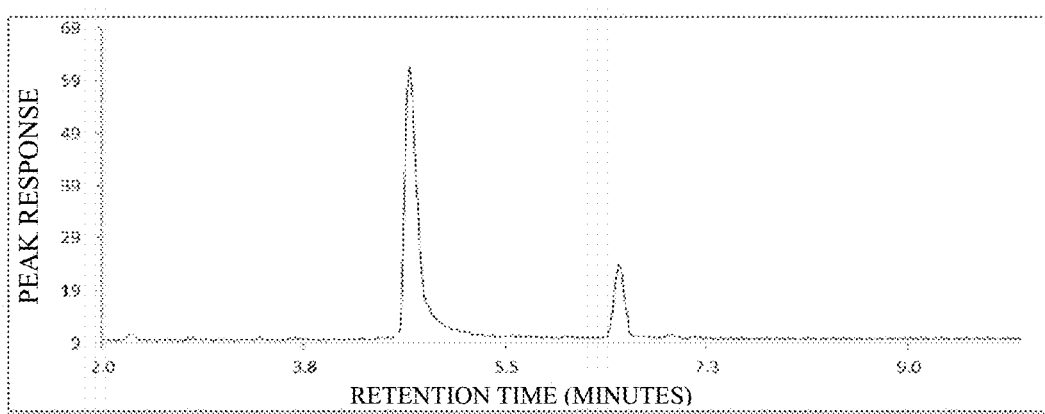
FIG. 3 of the Drawings shows the HPLC chromatogram of the composition 11 prepared in Example 11.
Figure 4:
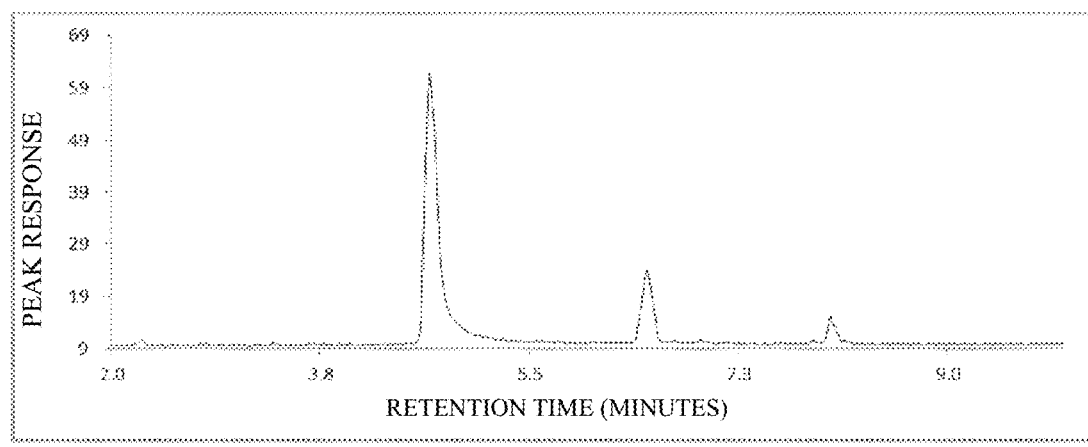
FIG. 4 of the Drawings shows the HPLC chromatogram of the composition 12 prepared in Example 12.
Figure 5:
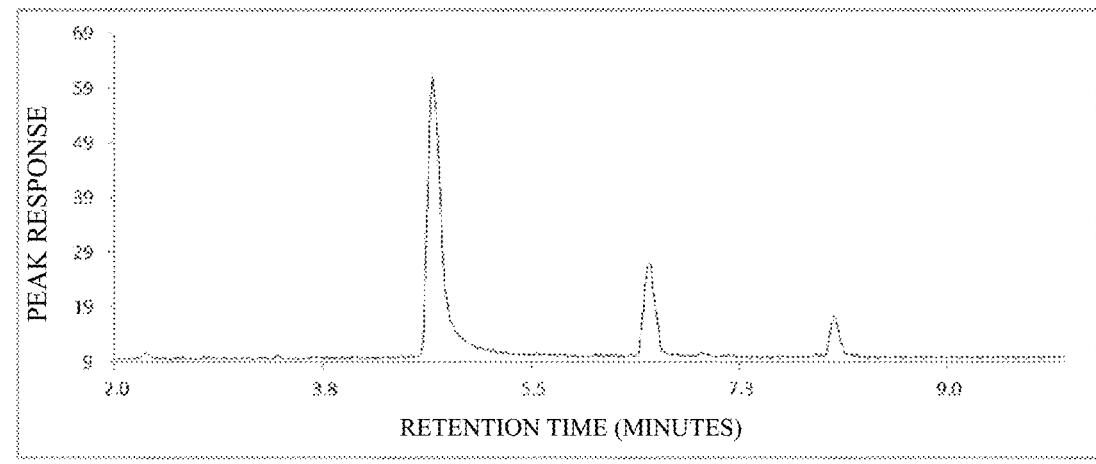
FIG. 5 of the Drawings shows the HPLC chromatogram of the composition 13 prepared in Example 13.
Figure 6:
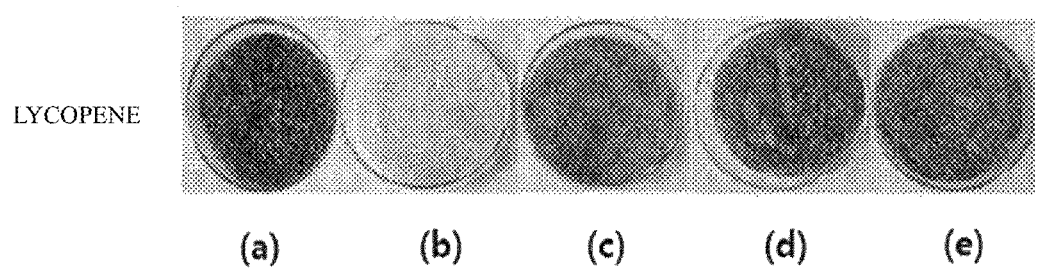
FIG. 6 of the Drawings shows the color protection effect of composition 9 to composition 11 on lycopene, in which (a) is a blank control group, (b) is a control group after high temperature treatment, (c) is a sample containing composition 9 after high temperature treatment, (d) is a sample containing composition 10 after high temperature treatment, and (e) is a sample containing composition 11 after high temperature treatment.

In order to make the purpose, technical solutions and advantages of the present invention more clear, the present invention will be further explained in detail with examples below. It should be understood that the specific examples described here are only for explaining the present invention, but not intended for limiting the present invention.

I. Preparation of the Composition Containing Quercetagetin

The composition products of Examples 1-8 were prepared according to the raw materials and parts by weight in the following table.

| | Quercetagetin (parts by weight) | 6-Hydroxykaempferol (parts by weight) | Patuletin (parts by weight) |
|---|---|---|---|
| Example 1 | 100 | 10 | 1 |
| Example 2 | 100 | 11 | 3 |
| Example 3 | 100 | 11 | 4 |
| Example 4 | 100 | 12 | 4 |
| Example 5 | 100 | 10 | 3 |
| Example 6 | 100 | 7 | 3 |
| Example 7 | 100 | 5 | 1 |
| Example 8 | 100 | 5 | 0 |

II. The First Batch of Experiments (1) Antioxidant Effect in Lipids 5 parts of chicken oil and butter were taken respectively, each of which is 100 grams. Each 3 groups of chicken oil experimental groups and butter experimental groups were set up, and the composition of Example 6 was added according to the addition amount of 4, 6 and 8 ppm respectively; each 1 group of chicken oil control group and butter control group were set up, and ethoxyquin was added in an addition amount of 150 ppm; each 1 group of chicken oil blank group and butter blank group were set up, without adding any additives. The additives in each group were mixed evenly with the lipid, placed in a constant temperature incubator at 40° C., and samples were taken at 0, 3, 7, 14, 21 and 28 days to determine their peroxide value. The results show that the composition of Example 6 can significantly reduce the peroxide value of lipids and delay the process of lipid oxidation loss. The antioxidant effect is comparable to that of ethoxyquin added in an amount of 150 ppm.

TABLE 1

The influence of Example 6 on the peroxide value of chicken oil (mmol/g)

| | Example 6 | | | | Ethoxyquin |
|---|---|---|---|---|---|
| | 0 ppm | 4 ppm | 6 ppm | 8 ppm | 150 ppm |
| Day 0 | 1.144 ± 0.025 | 1.050 ± 0.076 | 1.039 ± 0.102 | 1.139 ± 0.075 | 1.083 ± 0.029 |
| Day 3 | 1.272 ± 0.171a | 1.111 ± 0.035ab | 1.122 ± 0.098ab | 1.100 ± 0.044ab | 1.033 ± 0.067b |
| Day 7 | 1.839 ± 0.084a | 1.367 ± 0.087b | 1.361 ± 0.050b | 1.272 ± 0.039b | 1.117 ± 0.088c |
| Day 14 | 2.528 ± 0.096a | 2.417 ± 0.000b | 2.028 ± 0.192c | 1.483 ± 0.067d | 1.577 ± 0.092d |
| Day 21 | 5.222 ± 0.542a | 3.667 ± 0.726b | 2.872 ± 0.042c | 2.717 ± 0.044c | 2.817 ± 0.224c |
| Day 28 | 5.917 ± 1.013a | 5.556 ± 0.268a | 3.222 ± 0.141b | 2.989 ± 0.251b | 2.922 ± 0.325b |

TABLE 2

The influence of Example 6 on the peroxide value of butter (mmol/g)

| | Example 6 | | | | Ethoxyquin |
|---|---|---|---|---|---|
| | 0 ppm | 4 ppm | 6 ppm | 8 ppm | 150 ppm |
| Day 0 | 1.572 ± 0.123 | 1.550 ± 0.088 | 1.606 ± 0.121 | 1.400 ± 0.169 | 1.411 ± 0.150 |
| Day 3 | 1.978 ± 0.092a | 1.522 ± 0.092bc | 1.678 ± 0.190b | 1.328 ± 0.092bc | 1.444 ± 0.142bc |
| Day 7 | 2.178 ± 0.125a | 2.017 ± 0.132a | 1.767 ± 0.029b | 1.572 ± 0.269b | 1.617 ± 0.104b |
| Day 14 | 2.750 ± 0.083a | 2.133 ± 0.088b | 1.822 ± 0.211c | 1.683 ± 0.196c | 1.656 ± 0.075c |
| Day 21 | 3.333 ± 0.083a | 2.933 ± 0.161b | 2.111 ± 0.127c | 1.906 ± 0.092d | 1.817 ± 0.100d |
| Day 28 | 4.494 ± 0.243a | 2.889 ± 0.337b | 2.056 ± 0.173c | 1.956 ± 0.075c | 2.022 ± 0.197c |

(2) Feeding of Broilers

Experimental groups I-VI, a total of six groups, were set up, the composition of Example 6 was added to the feed at 1.25, 2.5, 3.75, 5, 10, 20 ppm respectively, and one control group was set up, the feed used in the control group was the same as that of the experimental group except that the composition of Example 6 was not added. A total of 147 1-day-old healthy Ross broilers (male:female ratio=1:1, average weight 46.7±2.34 g) were randomly divided into 7 groups, with 21 chickens in each group, and were fed according to the above addition amount. The average daily feed intake, average daily weight gain and ratio of feed to gain of the broilers in the above 7 groups throughout the whole period (1 to 42 days of age) were studied. The results show that when the composition of Example 6 is added to the feed, the ratio of feed to gain can be reduced. At the same time, when the additive dosage is 3.75 ppm, the ratio of feed to gain is the lowest.

TABLE 3

Effect of the feeding of broilers

| Group | Additives | Amount of the additives (ppm) | The ratio of feed to gain |
|---|---|---|---|
| Normal control | — | — | 1.54 ± 0.10$^a$ |
| I | the composition of Example 6 | 1.25 | 1.51 ± 0.12$^a$ |
| II | | 2.5 | 1.52 ± 0.11$^a$ |
| III | | 3.75 | 1.50 ± 0.12$^a$ |
| IV | | 5 | 1.51 ± 0.15$^a$ |
| V | | 10 | 1.53 ± 0.14$^a$ |
| VI | | 20 | 1.54 ± 0.23$^a$ |

III. The Second Batch of Experiments

Preparation Examples 9-17

Example 9: The flowers of marigold were extracted by acetone, then water and n-hexane phase were added to carry out liquid-liquid separation, the acetone aqueous phase was concentrated and filtered, and the filter cake was extracted with a mixed solvent of n-hexane and ethyl acetate at 1:0.5 to remove the impurities to obtain a composition containing quercetagetin, wherein the ratio of quercetagetin to 6-hydroxykaempferol is 100:3, which is composition 9.

Example 10: The French marigold were extracted by acetone, then water and n-hexane phase were added to carry out liquid-liquid separation, the acetone aqueous phase was concentrated and filtered, and the filter cake was extracted with a mixed solvent of n-hexane and ethyl acetate at 1:1 to remove the impurities to obtain a composition containing quercetagetin, wherein the ratio of quercetagetin to 6-hydroxykaempferol is 100:9, which is composition 10.

Example 11: The French marigold were extracted with n-hexane for degreasing, the obtained French marigold residues were extracted with methanol, concentrated and filtered, and the filter cake was extracted with ethyl acetate, the extract was concentrated and dried, and then repeatedly washed with pure water for 3 times to obtain a composition containing quercetagetin, wherein the ratio of quercetagetin to 6-hydroxykaempferol is 100:17, which is composition 11.

Example 12: The French marigold were extracted with n-hexane for degreasing, the obtained French marigold residues were extracted with ethyl acetate, the extract was concentrated and filtered, impurities were removed from the filter cake with n-hexane, and the solid phase was dried to obtain a composition containing quercetagetin, wherein the ratio of quercetagetin to 6-hydroxykaempferol is 100:22, and the ratio of quercetagetin to patuletin is 100:5, which is composition 12.

Example 13: The marigold were extracted with n-hexane for degreasing, the obtained marigold flower meal was extracted with 67% methanol, the extract was concentrated and filtered, the filter cake was extracted and purified with ethyl acetate, the extract was concentrated and dried, and then n-hexane was used to remove the impurities, and the solid phase was dried to obtain a composition containing quercetagetin, wherein the ratio of quercetagetin to 6-hydroxykaempferol is 100:31, and the ratio of quercetagetin to patuletin is 100:10, which is composition 13.

Example 14: The high-purity reference substances of quercetagetin and 6-hydroxykaempferol were mixed in proportion to obtain a composition with the ratio of quercetagetin to 6-hydroxykaempferol of 100:32, which is composition 14.

Example 15: The high-purity reference substances of quercetagetin and 6-hydroxykaempferol were mixed in proportion to obtain a composition with the ratio of quercetagetin to 6-hydroxykaempferol of 100:42, which is composition 15.

Example 16: The high-purity reference substances of quercetagetin, 6-hydroxykaempferol and patuletin were mixed in proportion to obtain a composition with the ratio of quercetagetin to 6-hydroxykaempferol of 100:10 and the ratio of quercetagetin to patuletin of 100:5, which is composition 16.

Example 17: The high-purity reference substances of quercetagetin, 6-hydroxykaempferol and patuletin were mixed in proportion to obtain a composition with the ratio of quercetagetin to 6-hydroxykaempferol of 100:10 and the ratio of quercetagetin to patuletin of 100:28, which is composition 17.

1. Determination of Antioxidant Capacity In Vitro

Each of the composition of Examples 9-17, as well as single-component quercetagetin, 6-hydroxykaempferol, patuletin was taken, and the detection of DPPH and hydroxyl radical scavenging ability was performed. The specific test methods are as follows.

(1) Determination of DPPH Free Radical Scavenging Ability

Quercetin, 6-hydroxykaempferol, patuletin, and compositions 9-17 were used to prepare sample solutions with concentrations of 1, 2, 3, 4, 5, and 6 µg/ml in absolute ethanol. Then, DPPH was prepared into a $2\times10^{-4}$ mol/L solution with absolute ethanol, and 2 mL of blank and sample solution were accurately absorbed and mixed with 2 mL of DPPH solution, respectively, the resultants were placed in a water bath at 30° C. in the dark for 30 min, and the absorbance A (blank) and $A_{sample}$ (sample) were measured at the wavelength of 517 nm.

Calculation Method for the Clearance:

$$\text{clearance }\% = \frac{A - A_{sample}}{A} \times 100\%$$

(2) Determination of Hydroxyl Radical Scavenging Ability (by Salicylic Acid Method)

Quercetin, 6-hydroxykaempferol, patuletin, and compositions 9-17 were used to prepare sample solutions with concentrations of 100, 150, 200, 250, 300 µg/ml in absolute ethanol. 9 mmol/L salicylic acid-ethanol solution, 9 mmol/L $FeSO_4$ solution and 8.8 mmol/L $H_2O_2$ solution were prepared. Then, different samples were added according to the order in the following table, and placed in a water bath at 37° C. for 15 min, and the absorbance at 510 nm was measured. Calculation method:

$$\text{clearance \%} = \frac{A0 - (Asample - Abackground)}{A0} \times 100\%$$

| Category | A0 | $A_{sample}$ | $A_{background}$ |
|---|---|---|---|
| Salicylic acid-ethanol solution | 1 ml | 1 ml | 1 ml |
| FeSO$_4$ solution | 1 ml | 1 ml | 1 ml |
| Sample solution | | 1 ml | 1 ml |
| water | 12 ml | 11 ml | 12 ml |
| H$_2$O$_2$ solution | 1 ml | 1 ml | |

The results of the two tests are shown in Table 4 below:

TABLE 4

Half clearance for DPPH and hydroxyl radical

| | DPPH (IC50 µg/ml) | Hydroxyl radical scavenging ability (IC50 µg/ml) |
|---|---|---|
| Quercetagetin | 14.82 | 412 |
| 6-hydroxykaempferol | 23.62 | 500 |
| Patuletin | 31.98 | 595 |
| Composition 9 | 6.02 | 303 |
| Composition 10 | 5.49 | 294 |
| Composition 11 | 6.06 | 301 |
| Composition 12 | 6.59 | 307 |
| Composition 13 | 10.64 | 358 |
| Composition 14 | 9.80 | 343 |
| Composition 15 | 14.03 | 391 |
| Composition 16 | 6.24 | 303 |
| Composition 17 | 6.11 | 301 |

The results in the above table show that under the condition of achieving the same antioxidant effect, the amount of the composition in the present application used is lower than that of the single-component product.

2. Antioxidant Effect in Fish Oil Powder

Fish oil powder containing quercetagetin, 6-hydroxykaempferol, patuletin or compositions 9-17 and blank fish oil powder were prepared according to the following ingredients and contents (based on active ingredients). After the antioxidant and fish oil powder were evenly mixed, the resultants were placed in an incubator at 40° C., and samples were taken in 28 days to measure the peroxide value. The results are shown in Table 5 below.

TABLE 5

Determination results of peroxide value in fish oil powder

| | Peroxide value of fish oil powder (mmol/g) with an addition amount of 10 ppm | Peroxide value of fish oil powder (mmol/g) with an addition amount of 100 ppm |
|---|---|---|
| Blank | 230 | |
| Quercetagetin | 76.54 | 57.32 |
| 6-Hydroxykaempferol | 142.14 | 121.24 |
| Patuletin | 120.46 | 108.57 |
| Composition 9 | 7.64 | 7.12 |
| Composition 10 | 6.17 | 5.54 |
| Composition 11 | 10.45 | 11.23 |
| Composition 12 | 14.32 | 13.78 |
| Composition 13 | 37.56 | 40.34 |
| Composition 14 | 38.26 | 41.54 |
| Composition 15 | 70.38 | 53.54 |
| Composition 16 | 12.13 | 11.14 |
| Composition 17 | 11.88 | 12.46 |

The results in the above table show that, as an additive for lipid-based components, the amount of the composition of the present application used is lower than that of the single-component product under the condition of achieving the same antioxidant effect.

3. Broiler Experiment

Composition 9 and composition 14 were added to the feed at 2, 6, 10 and 100 ppm (based on active ingredients) respectively as the experimental group, and a blank control group was set up. A total of 189 1-day-old healthy Ross broilers (half male and female, average weight 46.7±2.34 g) were randomly divided into 9 groups, with 21 chickens in each group, fed the same amount of the above-mentioned feeds, respectively, and the ratio of feed to gain of the above-mentioned 9 groups throughout the whole period (1-42 days of age) were studied. The results are shown in Table 6 below.

TABLE 6

Results of ratio of feed to gain of broilers

| | Ratio of feed to gain | Addition amount |
|---|---|---|
| Blank | 2.18 ± 0.08 | |
| Composition 9 | 2.11 ± 0.06 | 2 ppm |
| Composition 14 | 2.21 ± 0.04 | |
| Composition 9 | 2.01 ± 0.07 | 6 ppm |
| Composition 14 | 2.00 ± 0.08 | |
| Composition 9 | 2.02 ± 0.06 | 10 ppm |
| Composition 14 | 2.04 ± 0.05 | |
| Composition 9 | 2.08 ± 0.09 | 100 ppm |
| Composition 14 | 2.05 ± 0.05 | |

The results in the above table show that the ratio of feed to gain can be reduced when composition 9 and composition 14 were added to the feed. At the same time, when the addition dosage is more than 6 ppm, the ratio of feed to gain is significantly lower than that of the blank control group.

4. Color Protection Effect

The lycopene oleoresin and edible salt were thoroughly mixed and divided into four groups. Then, 200 ppm of compositions 9, 10 and 11 were added to three groups among them, and one group was used as a blank control group. The above four groups of samples were placed in an incubator at a constant temperature of 105° C. for 2 hours and then taken out, and their color changes were observed. The results are shown in FIG. 1 of the description.

The results show that compositions 9, 10 and 11 could all delay the loss of pigment at high temperature.

INDUSTRIAL APPLICABILITY

The present invention provides a composition containing quercetagetin, containing quercetagetin and 6-hydroxykaempferol, and further containing patuletin. The composition has an excellent antioxidant effect, and can be used as an active additive ingredient in food, drugs, health care products, cosmetics and feed. In addition, the composition can promote animal growth, reduce ratio of feed to gain, and improve meat quality in the feed.

What is claimed is:

1. A composition containing quercetagetin, wherein the composition comprises quercetagetin and 6-hydroxykaempferol, and wherein a content ratio of quercetagetin: 6-hydroxykaempferol is 100: (1-43),
    wherein the composition further comprises patuletin, and a content ratio of quercetagetin: patuletin is 100: (1-40).

2. The composition according to claim 1, wherein the content ratio of quercetagetin: 6-hydroxykaempferol is 100: (1-35).

3. A feed comprising the composition of claim 1.

4. A food comprising the composition of claim 1.

5. A grease composition comprising the composition of claim 1 and a grease.

6. A pigment composition comprising the composition of claim 1 and a pigment.

7. A vitamin composition comprising the composition of claim 1 and a vitamin.

8. A protein composition comprising the composition of claim 1 and a protein.

9. A carbohydrate composition comprising the composition of claim 1 and a carbohydrate.

10. The composition according to claim 1, wherein the content ratio of quercetagetin: 6-hydroxykaempferol is 100: (1-30).

11. The composition according to claim 1, wherein the content ratio of quercetagetin: 6-hydroxykaempferol is 100: (1-25).

12. The composition according to claim 1, wherein the content ratio of quercetagetin: 6-hydroxykaempferol is 100: (1-20).

13. The composition according to claim 1, wherein the content ratio of quercetagetin: 6-hydroxykaempferol is 100: (1-15).

14. The composition according to claim 1, wherein the content ratio of quercetagetin: patuletin is 100: (1-35).

\* \* \* \* \*